United States Patent
Korajda et al.

(10) Patent No.: US 7,853,335 B2
(45) Date of Patent: Dec. 14, 2010

(54) METHOD FOR OPERATING MACHINES WITH ADAPTABLE MOTION PROFILES

(75) Inventors: Bartosz Korajda, Lohnann Main (DE); Sebastian Krauskopf, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 12/025,119

(22) Filed: Feb. 4, 2008

(65) Prior Publication Data

US 2008/0188953 A1    Aug. 7, 2008

(30) Foreign Application Priority Data

Feb. 5, 2007    (DE) .................... 10 2007 006 422

(51) Int. Cl.
  *G05B 19/18*    (2006.01)
  *G06F 19/00*    (2006.01)
(52) U.S. Cl. ..................... 700/3; 700/186; 700/187; 700/188; 700/189; 700/56; 700/61
(58) Field of Classification Search ............ 700/30, 700/186–189, 3, 61, 56
See application file for complete search history.

(56) References Cited

U.S. PATENT DOCUMENTS

| | | | |
|---|---|---|---|
| 6,366,045 B1 * | 4/2002 | Fahrbach et al. ............ 318/560 |
| 6,442,442 B1 * | 8/2002 | Weinhofer ................... 700/86 |
| 6,701,210 B2 * | 3/2004 | Heber et al. ................ 700/189 |
| 6,842,651 B1 * | 1/2005 | Hashimoto .................. 700/18 |
| 7,013,328 B2 * | 3/2006 | Monse et al. ............... 709/208 |
| 7,024,257 B2 * | 4/2006 | Pearce et al. ................ 700/72 |
| 7,305,290 B2 * | 12/2007 | Russ et al. .................. 701/36 |
| 2002/0022905 A1 * | 2/2002 | Erlanoen et al. ............ 700/181 |
| 2003/0004594 A1 * | 1/2003 | Liu et al. .................... 700/95 |
| 2003/0078692 A1 | 4/2003 | Heber et al. |
| 2004/0128022 A1 * | 7/2004 | Fujibayashi et al. ......... 700/213 |
| 2005/0278130 A1 * | 12/2005 | McNutt ....................... 702/73 |
| 2005/0284316 A1 * | 12/2005 | Rugamer .................... 101/216 |
| 2006/0224932 A1 * | 10/2006 | Ruppel et al. .............. 714/100 |
| 2006/0241789 A1 * | 10/2006 | Mirza ......................... 700/61 |

(Continued)

FOREIGN PATENT DOCUMENTS

DE    102 21 062    12/2002

(Continued)

OTHER PUBLICATIONS

Cheng et al. "Real-time NURBS command generators for CNC servo controllers"; 2002; Elsevier; International Journal of Machine Tolls & Manufacturing; pp. 801-813.*

(Continued)

*Primary Examiner*—Albert DeCady
*Assistant Examiner*—Jason Lin
(74) *Attorney, Agent, or Firm*—Michael J. Striker

(57) ABSTRACT

For operating controlled machines, a slave motion of at least one movable machine element of the machine is controlled using a motion profile specific to that motion, and this motion profile of the motion of the machine element is subdivided into a plurality of profile segments. The profile segments are each assigned masters, and the masters depend on predetermined command variables, motion profile in the individual profile segments depends in each case on the respective masters, at least two masters are different from one another, and at least two masters of the motion profile depend on command variables that are different from one another.

12 Claims, 3 Drawing Sheets

U.S. PATENT DOCUMENTS

2009/0125125 A1* 5/2009 Horn et al. .................... 700/18

FOREIGN PATENT DOCUMENTS

DE      10 2005 012 876       9/2006
EP      1 220 069             7/2002

OTHER PUBLICATIONS

VDI 2143, Blatt 1, "Motion Rules for Cam Mechanisms Theoretical Fundamentals", Association of German Engineers, Oct. 1980.
VDI 2143, Blatt 2, "Motion Rules for Cam Mechanisms Practical Application", Association of German Engineers, Jan. 1987.

* cited by examiner

METHOD FOR OPERATING MACHINES WITH ADAPTABLE MOTION PROFILES

CROSS-REFERENCE TO A RELATED APPLICATION

The invention described and claimed hereinbelow is also described in German Patent Application DE 10 2007 006 422.7 filed on Feb. 5, 2007. This German Patent Application, whose subject matter is incorporated here by reference, provides the basis for a claim of priority of invention under 35 U.S.C. 119(a)-(d).

BACKGROUND OF THE INVENTION

The present invention relates to a method for operating electronically controlled machines, in particular, and to a control device for operating controlled machines.

The method of the invention and the apparatus of the invention are described with respect to packaging machines, textile machines, and the like. However, it will be noted that the method and the apparatus can also be used for other kinds of machines, such as printing presses or automation systems. The invention is moreover suitable for electrically, hydraulically, or pneumatically controlled machines as well.

In terms of the disclosure of the present invention, the further German patent application entitled "Method for Operating Controlled Machines", filed simultaneously with the present application by the present Applicant, is referred to, the entire disclosure of which is hereby incorporated by reference into the present application.

Such methods for operating machines have long been known in the prior art. Such controllers for instance make it possible to guide the motion of movable machine elements of these machines. These machine elements are controlled using a motion profile specific to the motion. In the prior art, it is known to describe suitable motion profiles or cam disks as a rigid path of motion that is traversed cyclically. For instance, DIN 21 43 (in which the cam disk is described as a rigid path of motion that is cyclically traversed) is based on such controllers.

In the method from the prior art, however, the course of the cam disk is merely cyclical and is fixedly defined from beginning to end. Any change in the path of motion is therefore possible only by manually switching to a different cam disk.

European Patent Disclosure EP 1 220 069 B1 describes a method for setting up flexible cam disk functions by way of a control or applications program. A cam disk function that describes a motion of a machine element is described in portions; successive motion portions are defined by segments or points, and between such motion portions, interpolation is done in accordance with a predeterminable interpolation rule. Commands for predetermining and inserting points, segments, and interpolation rules for the transit time are provided, and the cam disk function is set up by way of commands in the transit time system of a machine controller. At the same time, in EP 1 220 069 B1, a cyclical or rigid motion sequence is generated, which always depends on a command variable, and in particular no jumps in individual motion steps of the motion sequence are possible. The individual paths of motion are moreover only limitedly changeable.

Nor is it possible in the method described in EP 1 220 069 B1 to design the course of motion independently of a plurality of mutually independent reference variables.

SUMMARY OF THE INVENTION

It is therefore the object of the present invention to furnish a method for operating controlled machines, which permits a motion as a function of a plurality of independent and different guide sources. It is also the object to furnish a method and an apparatus which permit fast, flexible reaction to process events.

In keeping with these objects and with others which will become apparent hereinafter, one feature of the present invention resides, briefly stated, in a method for operating controlled machines, comprising controlling a slave motion of at least one movable machine element of the machine using a motion profile specific to that motion; subdividing the motion profile of the motion of the machine element into a plurality of profile segments; assigning the profile segments each assigned masters; making the masters depend on predetermined command variables, and making the motion profile in the individual profile segments dependent in each case on a respective one of the masters; providing the masters such that at least two masters are different from one another; and making the at least two masters of the motion profile dependent on command variables that are different from one another.

Another feature of the present invention resides, briefly stated, in a control apparatus for operating numerically controlled machines, comprising means configured such that a motion of at least one movable machine element of the machine is controlled using a motion profile specific to that motion, and this motion profile is subdivided into many profile segments; and a control device which causes each of the profile segments to be assigned masters, so that the masters depends on predetermined command variables, and the motion profile in the various profile segments results in each case from the respective masters, and at least two masters are different from one another, and at least two masters of the motion profile depend on command variables that differ from one another.

In the method of the invention for operating controlled machines, in which a slave motion of at least one movable machine element of the machine is controlled using a motion profile specific to that motion, and this motion profile of the motion of the machine element is subdivided into a plurality of profile segments.

According to the invention, the profile segments are each assigned masters, and the masters depend on predetermined command variables, and the motion profile in the individual profile segments results in each case from the various masters or depends on them, and at least two masters differ from one another and are preferably also independent of one another, and at least two masters of the motion profile depend on command variables that are different from one another.

The term slave motion is understood to mean a motion of the machine element that takes place in reaction to a predetermined function, such as a predetermined master axis. In mathematical terms, the slave motion is based on a function f(x), which is dependent on a variable x. However, it is also possible for this function to be dependent on a plurality of variables independent of one another.

The term "masters" for instance, as in the prior art, is understood also to mean master axes. These can in turn be determined by different command variables.

Hence according to the invention, a method is proposed for generating a slave motion from the linkage of a plurality of independent, different command variables or masters. By means of this novel functionality, an optimal and above all flexible guidance of motion in the aforementioned machines can be employed. More specifically, the various profile segments of the motion profile, or the entire motion profile, may be assigned a plurality of different or arbitrarily selectable guide sources. Thus according to the invention, the motion profile is attained as a function with a plurality of variables.

Advantageously, the command variables are selected from a group of command variables which includes positions, such as positions of further elements; times; pressures; velocities; torques; forces; combinations of these; and the like. It is especially advantageously possible for different command variables to be at least partially differently weighted. Thus with the method, the aforementioned different command variables are taken into account in ascertaining the motion profile, and in particular are also differently weighted.

It is also possible to cascade different command variables, or in other words not to take the dependency on a second variable into account until the dependency on a first variable has led to a certain result. Preferably, the slave motion is generated in real time; that is, the method of the invention is a real-time-capable method.

Advantageously, at least one motion profile, resulting from a profile segment, is used as a master or command variable for a further profile segment in other words, a resultant path of motion itself is again used as a command variable for a master of a further profile segment, or a further slave motion path. As a result, these profile segments can be designed more flexibly. Mathematically, this embodiment means that the resultant profile segment results from a function $g(f(x))$, and this function describes the finally resulting path of motion. Still other mathematical linkages are conceivable, such as a superposition or cancellation of individual masters or command variables, or a reinforcement of individual command variables.

In a further preferred method, a plurality of masters are linked together. This means on the one hand that profile segments can be linked together without gaps or kinks, and on the other hand that a plurality of masters can be designed to be dependent for instance on individual common command variables but independently of other command variables. For instance, one motion profile (motion segment) could result from a function $f(x, y)$, and a further motion profile (motion segment) could result from a function $g(x, z)$.

It is also advantageous to provide at least one intermediate segment, with which a transition between two profile segments that depend on different masters is ascertained. Preferably, this intermediate segment, which will hereinafter also be called a flex segment, can calculate the transition between different profile segments or motion sectors in real time. For instance by means of such a flex segment, a transition between a time-based control and a location-based control can be made possible. This will be explained in more precision with reference to the drawings. Such a flex segment can also be located at either the beginning or end of a motion profile, to assure synchronization with beginning and ending points.

In a further advantageous method, each of the profile segments is assigned at least one motion condition that varies this profile segment, and each motion condition includes at least one tripping event and at least one action event, associated with this tripping event and tripped by the tripping event, and the action event varies the profile segment.

The term "motion condition" is thus understood to mean a combination of at least one tripping event and one action event associated with this tripping event. Preferably, each tripping event is assigned precisely one action event. Conversely, one action event can be assigned a plurality of tripping events. The term "profile segments" is understood, as noted, to mean excerpts of the entire motion profile. Preferably, the individual profile segments are located in line with one another and in their entirety they produce the total motion profile of the motion of the machine element. Conditions can also be assigned to the entire motion profile or to a plurality of profile segments.

By the provision of motion conditions for the individual profile segments, direct influence on the segment is possible, and jumps from a certain profile segment to another profile segment are also possible. For instance, in the presence of a certain tripping event, a jump can be made from a third profile segment to a seventh profile segment.

Advantageously, the aforementioned conditions are monitored at the instant of execution and transacted in real time. The various path changes and changes in the motion profile that are tripped by the conditions are also recalculated in real time. In this way, a realtime-capable and event-controlled motion guidance is achieved, and fast, flexible adaptation of motion profiles to external events is possible. Also, as noted, jumps between the segments within one motion profile are possible, which leads to great path calculation flexibility and high user-friendliness, or in other words intuitive operation. A fast reaction to process events is also possible.

Preferably, by means of a tripping event, a change in at least one profile segment is accomplished. However, it is also possible by a tripping event to influence a plurality of profile segments. Tripping events may be various states or command variables. In addition, as tripping events, external events and user-controlled tripping events can also be considered.

The change in this profile segment is preferably calculated in real time, which enhances the flexibility of the method.

Advantageously, the calculation of the change in a profile segment or in the motion profile is performed by means of predetermined motion laws and especially preferably is done in real time. Motion laws define the regularity of gear input and gear output functions for instance, and in general for the representation of motion profiles and thus define the course of the path. A law of motion is unambiguously defined in general by way of the parameters of stroke, master portion, or mathematically expressed the portion on an X axis for a function $f(x)$, via peripheral values of the applicable segment, and turning point displacements. The peripheral values can each be represented by their parameters of velocity, acceleration and jerk, jerk being the derivation of the acceleration in accordance with time.

Examples of (standardized) transition functions are $n^{th}$ degree polynomials, in particular fifth- or seventh-degree polynomials; linear rest, modified acceleration trapezoids, and the like. In the context of this description, stroke is defined as a function of the master portion.

The present invention is also directed to a control apparatus for operating controlled machines, and this control apparatus is designed such that it controls a motion of at least one movable machine element of the machine, using a motion profile specific to that motion; this motion profile is subdivided into many profile segments. According to the invention, a control device is provided, which causes the profile segments each to be assigned masters, and the masters depend on predetermined command variables, and the motion profile in the individual profile segments results in each case from the respective masters, and at least two masters are different from one another and preferably independent of one another, and at least two masters of the motion profile depend on command variables that differ from one another.

With the apparatus of the invention, greater flexibility of the motion profiles is attained. As a result of the dependence on a plurality of command variables, automatic or dynamic adaptation to the process state can also be accomplished, and by intuitive operation, greater user-friendliness is possible. The path calculation flexibility is enhanced as well.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
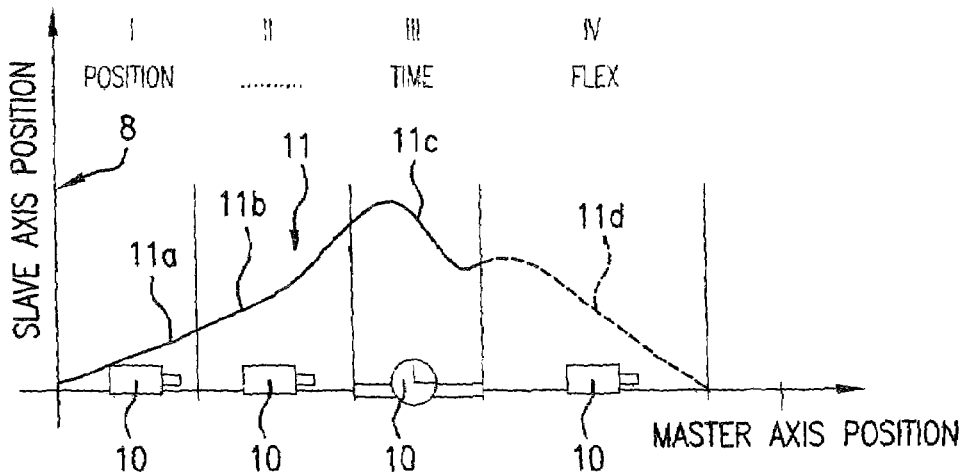
FIG. 1 is an illustration of a method according to the invention for generating a motion profile.

FIG. 1 shows an illustration of a motion profile 11 which is dependent on a plurality of masters. This profile has four profile segments 11a-11d, which are located in four master axis portions I-IV. In the first profile segment 11a, the position, for instance the position of an element or of a master axis, serves as the master. On the basis of this master axis position, the slave axis position is calculated, resulting in the motion profile 11 in this first master axis portion I. Reference numeral 10 symbolizes the individual masters.

In the second master axis portion II, the slave axis position 8 can also be determined on the basis of a master axis position, but still other status variables are conceivable for determining the slave axis position.

In the third master axis portion II, the slave axis position 8 is determined as a function of time and is thus preferably not directly dependent on the master axis position. The profile segment 11d is embodied as a flex element, for synchronizing motion steps that depend on different command variables.

The motion profile 11 in its entirety is thus a function with a plurality of variables. The plan of motion not used elsewhere] is generated here as a combination or serial lineup of a plurality of motion steps or profile segments, and optional connection and synchronizing steps (namely the flex elements) are present between the profile segments or motion steps having the different command variables.

The flex element 1Id in master axis portion IV is dependent, in terms of its peripheral conditions, on a plurality of command variables. The final motion plan of this flex segment therefore cannot result until the transit time. This final path of motion in the profile segment 11d is calculated by a controller in real time on the basis of a previously defined motion plan. In this way, automatic or dynamic adaptation to the process state is obtained.

Thus different command variables are integrated into one motion profile. As motion steps, motion laws for cam drives (for instance in accordance with DIN 2143) are suitable, as are general mathematical motion descriptions that will be described in more precision below.

Hence simpler, more-flexible and more-general principles for generating the motion profiles are made possible.

Figure 2:
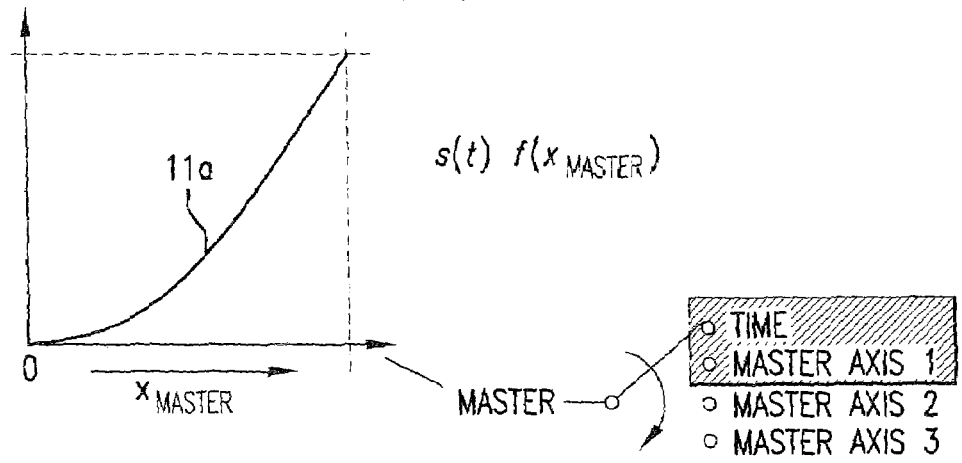
FIG. 2 is a graph to illustrate the various masters.

FIG. 2 is a diagram for illustrating a motion profile generated on the basis of a plurality of masters. Reference numeral 11a again refers to the motion profile in one profile segment. On the X axis, the master portion 13 of a special master is plotted, and the stroke 14 is plotted on the Y axis. On the basis of motion laws, the legality between the driving and the gear output function is defined and thus the course of the path is defined. A motion law is defined unambiguously in general by way of the parameters of stroke, master portion, left peripheral values R1, right peripheral values R2, turning point shifts, and a standardized transition function. Examples of standardized transition functions that can be taken into account are $n^{th}$-degree and in particular fifth-degree polynomials, linear rest, modified sinoids, modified acceleration trapezoids, and many more. The peripheral values R1, R2 are each indicated with the components of velocity, acceleration and jerk, where "jerk" is the derivation of the acceleration in accordance with time.

Figure 3:
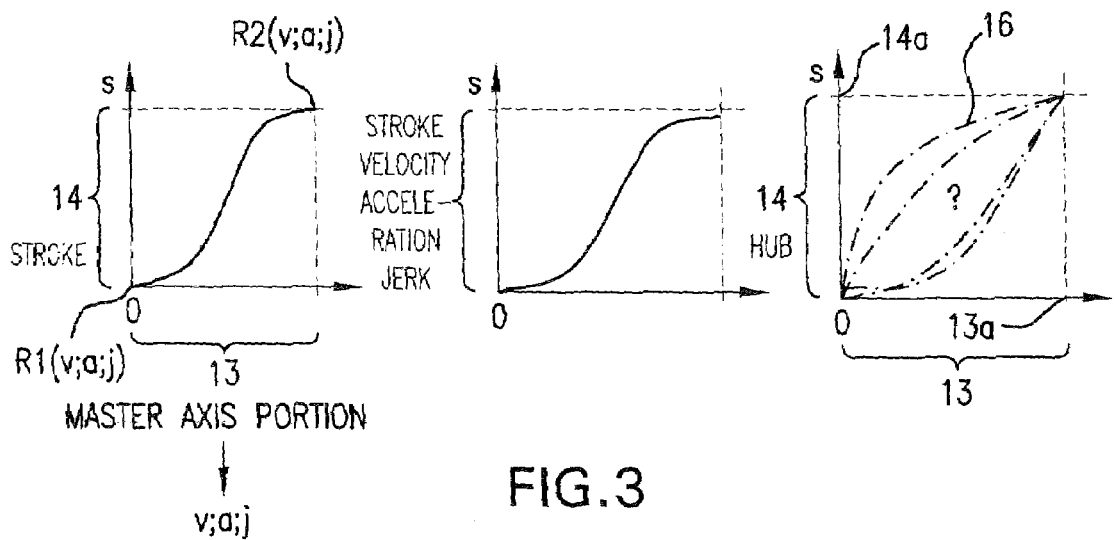
FIG. 3 is a graph to explain the flex segments of the invention.

Unlike the prior art, however, in this case it is not merely one master axis but rather a plurality of master axes that are made the basis. The motion profile s(t) is obtained as a function of the master axis portion $x_{master}$. This master may on the one hand be time, or, as shown in FIG. 2, it may be different master axes 1-4. For the master axes in turn, different status variables may be used. Thus besides the definition of the motion laws for each profile segment, a master must be defined. In doing so, unlike conventional cam disk versions, which provide only one master for the entire profile, it is also possible to define a different master for each segment. A master may, as noted, be an arbitrary master axis, or time, FIG. 3 is an illustration for the flex portions or segments described in the context of the present application. The left-hand portion of the drawing refers to a conventional portion of a motion profile. In it, a certain master portion 13 (or master axis portion) is specified, and on the basis of a certain motion law, a slave axis portion, or the stroke 14, results. Thus from the motion laws, the code values are simultaneously obtained for the velocity v, acceleration a, and jerk j. The middle portion of the drawing shows a flex segment according to the invention. Once again, the slave axis portion is predetermined on the basis of the defined peripheral conditions. The code values for the velocity v, acceleration a, and jerk j are predetermined as well. More precisely, the motion laws produce the demands in terms of the maximum velocity v, the acceleration a, and the jerk j. On the basis of these predetermined factors, the master axis portion 13 here is obtained. Thus the flex profiles here serve not only as a conventional cam disk but also as a general motion profile for optimized positioning and movement of axes.

The right-hand portion of FIG. 3 in turn illustrates a flex segment. In principle, this flex segment has properties similar to those of a standard segment. However, in contrast to a standard segment, is determined either from the stroke or an absolute slave axis target position 14a and either a master portion 13 or an absolute master target position 13a. The flex segment, like the standard segment, is also determined by the peripheral values R1 on the left and the peripheral values R2 on the right, the turning point shift and a standardized transfer function. Thus with a flex segment, instead of the stroke 14, an absolute slave axis target position to be reached, and instead of the master portion a master axis final position absolutely to be reached, can be indicated. For instance, the stroke and the master portion can then be calculated for the transit time. The peripheral values are preferably likewise adapted such that velocity jumps with respect to the element to be moved are avoided. It is moreover possible for the flex segment to take on the peripheral values of the adjacent segments for the transit time. Within the master portion in the right portion of the drawing, the motion profile can assume various courses.

As mentioned above, in principle a distinction can be made between two types of segment, namely a standard segment, and the flex segment (see FIG. 3) described in the present invention. The standard segment is distinguished by a rigid master coupling. Hence this segment is unambiguously defined and has a static path of motion. Standard segments, however, are always statically defined in relative terms, or in other words via the stroke and the master portion, for instance.

If a segment is marked flex, it can be considered as an active segment. Its path of motion is corrected and adapted to the transit time, that is, in real time, based on previously defined peripheral values. In this way, the flex segments serve among other purposes to provide synchronization among segments with different masters. The motion course within the flex segment, that is, at the peripheries of the flex segment, can be adapted to process conditions, so as to avoid jerking and the like, for instance.

Figure 4:
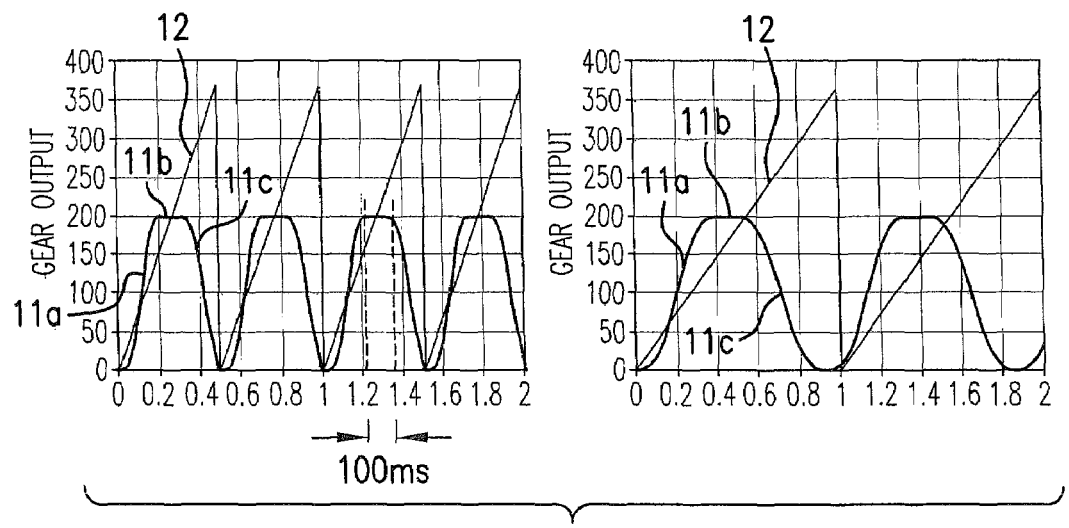
FIG. 4 is a two-dimensional timing graph to illustrate a motion profile with different masters.

FIG. 4 shows a further illustration of the generation of the motion profile, using different master axes and masters. More precisely, reference numeral 12 identifies the motion of the master axis. The time t is plotted in seconds on the coordinate. The motion profile is subdivided here into three profile segments 11a, 11b, 11c. Each profile segment 11a, 11b, 11c has been separately specified a respective master, and the profile segment 11b follows the time. Hence the profile segment 11b is independent of the master axis 1, or master axis profile 12. The profile segment 11b is always traversed for 100 milliseconds.

The motion profile in the first profile segment 11a is represented here by a modified acceleration trapezoid; this involves a rest→rest transition, or in other words a transition from the velocity v=0 of the moving element to a velocity v=0. The second profile segment 11b, which is dependent on time, is likewise an R→R segment, but here no stroke occurs, and hence the profile segment 11b extends parallel to the coordinate. The master portion here amounts to precisely 100 milliseconds, regardless of the master axis.

The third profile segment 11c can be described by a motion law in the form of a fifth-order polynomial; once again, a stroke of −200 mm is traversed, and the master portion here is 150°. The term "degrees" refers to a revolution of the master axis and relates to one complete revolution of 360°. In the second portion of the drawing, the velocity of the master axis, for instance of 120 revolutions per minute, has been reduced to 60 revolutions per minute. It can be seen that the length of the second profile segment, which is independent of the master axis, is 100 milliseconds in each of the two portions of the drawing. Since the other two profile segments 11a and 11c, however, are dependent on the master axis, they are expanded as well, with the motion of the master axis. Thus the chronological length of the profile segments 11a and 11c changes, but not that of the profile segment 11b.

Figure 5:
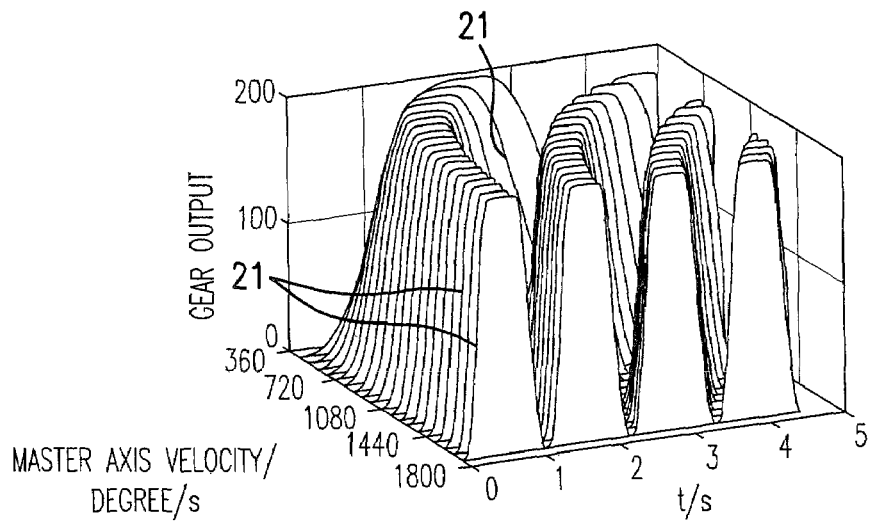
FIG. 5 is a three-dimensional view to illustrate motion profiles at different master velocities.

FIG. 5 shows a further illustration, and in this case the motion profiles 21 have been plotted for many velocities of the master axis. It can be seen that the resting phase or the respective second profile segment 21b always amounts to 100 milliseconds. Because of the free choice of the master, a decision can also be made as to whether a segment is to be time-controlled or traversed as a function of a predetermined master axis.

Figure 6:
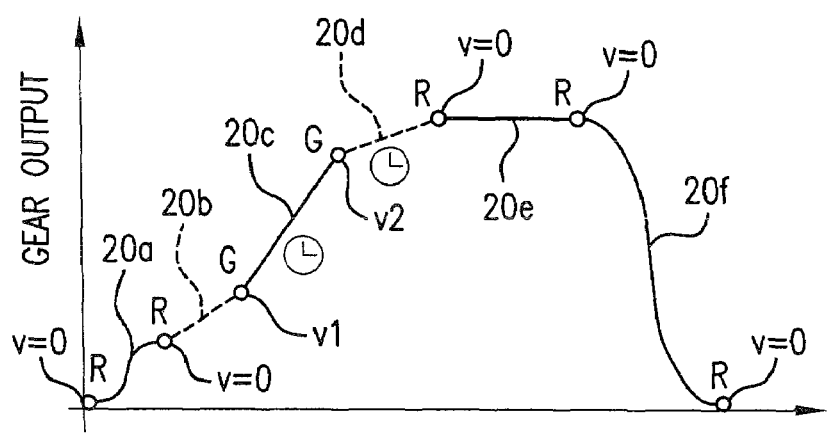
FIG. 6 shows a motion profile with two profile segments with a time master.

FIG. 6 shows a motion profile 20 with six portions 20a, 20b, . . . , 20f. Here, two profile segments 20b and 20d are provided with time masters, which is represented by the two clocks. Two relative flex elements 20b and 20d, between the segments 20a and 20c, on the one hand and 20c and 20e on the other, serve as synchronizing elements for a jerk-free transition.

In the illustration shown, the first profile segment 20a, which describes a transition R→R, is described for instance by an acceleration-optimized sine wave. The master here is the master axis. In the case of the flex element 20b, which represents a transition from a velocity v=0 to a final velocity v1 (R→G), a modified sinoid is used as the motion law. The profile segment 20c describes a transition from a velocity v1 to a further velocity v2 and thus a transition G→G. As the motion law in this case, a linear interpolation is employed, and the master portion here amounts to 200 milliseconds. The profile segment or flex element 20d in turn describes the transition from a velocity v2 to a position of repose, or in other words in which v=0. As the motion law in this case, a fifth-order polynomial is used. The master portion here is again 100 milliseconds. The profile segment 20e describes a linear rest, that is, a transition from a velocity v=0 to a velocity v=0. The last segment 20f, finally, describes a transition from a velocity v=0 to the velocity v=0, with a modified sinoid used here as the motion law.

Figure 7:
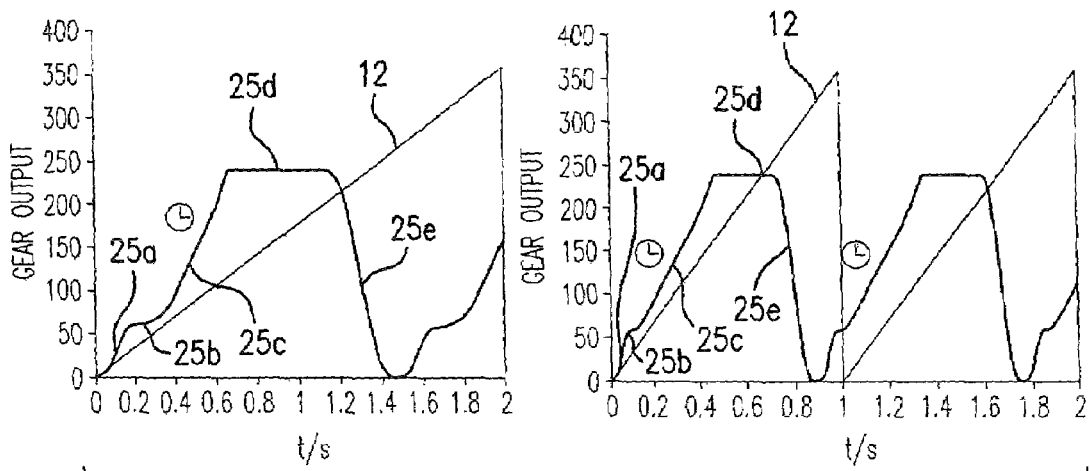
FIG. 7 is an illustration of a motion profile with a time master.

FIG. 7 shows a further illustration of a motion profile at different master axis velocities. The master axis motion is identified here by reference numeral 12, and the motion of the slave axis is shown in five profile segments, identified by reference numerals 25a-25e. In the left-hand portion of the drawing, the master axis has a certain number of revolutions, for instance 30 rpm, and in the example on the right, it has a number of revolutions twice that, that is, 60 rpm.

The profile segment 25c here is a segment with a time master. It can be seen that this segment, because of the faster revolution, is not compressed. Relative flex segments, for instance in this case segments 25b and 25d, experience the change of master without jerking at the transit time.

Figure 8:
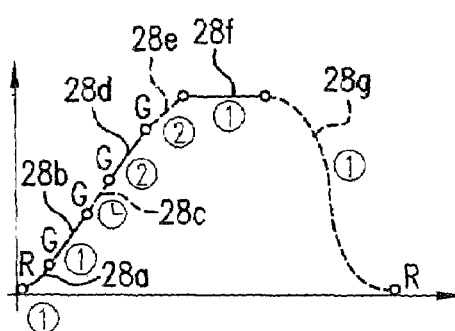
FIG. 8 shows a motion profile with different masters and flex segments.

FIG. 8 shows a further illustration of a motion profile with a plurality of masters (1 and 2). Here, the motion profile is subdivided into a total of seven profile segments 28a-28g. The first two profile segments 28a and 28b depend on a respective first master or master axis. The fourth profile segment 28d depends on a second master, which once again is a master axis. Between the two profile segments 28b and 28d, a relative flex segment 28c is provided, and as a motion law in this case a fifth-order polynomial is used. In the first profile segment, a fifth-order polynomial is used as the motion law, and in the second profile segment 28b, a linear interpolation is used as the motion law.

In the flex segment 28c, synchronization takes place over time; in this case, the master is time. This flex segment 28c has a fixed master portion of 40 milliseconds. The sixth profile segment 28f in turn depends on the master 1 or the master axis 1. This is a transition R→R, or in other words a linear rest. For synchronization, a flex element 28e is located between the fourth profile segment 28d and the sixth profile segment 28f; here, a transition takes place from a velocity v1 to v=0, and as the motion law, a fifth-order polynomial is employed. Reference numeral 28g refers to the seventh profile segment, which once again is embodied as a flex segment and handles a transition R→R.

Thus the motion profile shown in FIG. 8 initially contains synchronous travel R→G (in profile segment 28a) and G→G (in profile segment 28b) on master axis 1, a subsequent change over time (40 milliseconds, profile segment 28c) to master axis 2 (profile segment 28d). This is adjoined in turn by synchronous travel with the master or master axis 2 (28d), then a change, over relatively 20°, of the master axis 2 (28e) to repose (rest) with the master axis 1 (28f). Finally, as described above, via an absolute flex element 28g, the absolute relationship with the master axis 1 to 360° is restored. Thus the final point R is defined not over a master portion, the way the other points are, but rather via the absolute final point of one complete revolution. The indications shown in the circles refer to the respective fundamental masters.

Figure 9:
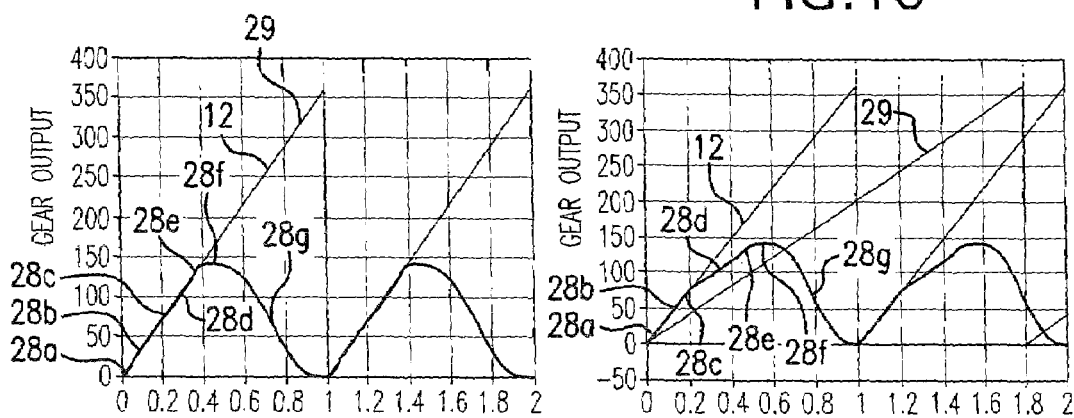
FIG. 9 is an illustration of a motion profile with a plurality of masters upon a change in a master.

FIG. 9 shows an overall view of the motion profile ascertained in FIG. 8. In the left portion, the first master axis 12 and the second master axis 29 each have the same velocities and are therefore plotted one on top of the other and cannot be separated from one another.

In the right-hand portion, the velocity of the second master axis is reduced, which leads to changes in individual segments of the motion profile 28a-28g. In precise terms, as a result of the velocity changes of the second master axis, first the profile segments 28d and 28e are varied or stretched out. The profile segments 28a and 28b, however, remain unchanged, as can be seen from a comparison of the two portions of FIG. 9. As a result of the stretching of the two profile segments 28d and 283 that are dependent on master axis 2, the absolute flex segment 28g must also be adapted or compressed, as can also be seen from a comparison of the two portions of FIG. 9. Thus once again, the individual profile segments each follow their respective masters, and the flex segments 28c, 28e and 28g serve as resynchronizing elements between changes of master. The profile segment 28g moreover, as an absolute flex segment, assures that the motion profile can again be oriented absolutely to the master axis 1, or in other words in this case to the 360° position. The next traversal through the motion profile thus begins again at a modulo overflow. However, it will be noted here that the method of the invention is fundamentally not bound to the modulo limits named, but instead can be used flexibly.

Figure 10:
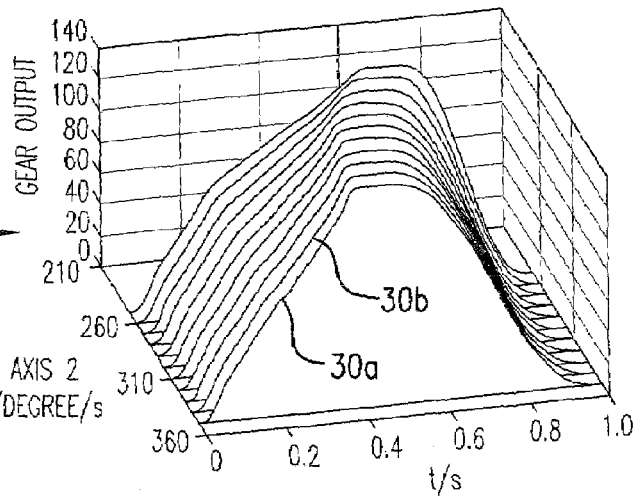
FIG. 10 is a three-dimensional view of a plurality of paths of motion of the same motion profile with different masters and varying master velocities

FIG. 10 shows different paths of motion or motion profiles 30a, 30b, . . . , for a master axis 2 moving variously rapidly. In this case the velocity of the master axis 1, in all the paths of motion, is 360 rpm. Once again it can be seen that individual profile segments remain constant, while others, as noted, are varied as a consequence of the velocity changes of the master axis 2.

In summary, the cam disks of the invention are distinguished by the fact that a guiding motion profile can be parametrized, and a reaction to process events or other process signals, such as time, is possible. The path realization results from suitable parametrizing during the drafting phase and from process variables at the transit time. Thus a flexible motion profile can be achieved for different or arbitrary workpiece variants master axis velocities, and so forth. An event-controlled change in the planned path in the ongoing process and even in ongoing motion is also possible. The overall result is greater flexibility, faster retrofitting, less effort and expense, and greater performance.

It will be understood that each of the elements described above, or two or more together, may also find a useful application in other types of constructions differing from the type described above.

While the invention has been illustrated and described as embodied in a method for operating machines with adaptable motion profiles, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. A method for operating controlled machines, comprising the steps of:
    controlling a slave motion of at least one movable machine element of the machine using a motion profile specific to said motion;
    subdividing the motion profile of the motion of the machine element into a plurality of profile segments;
    assigning the profile segments each assigned masters, wherein each of said profile segments is assigned to a different master;
    providing a plurality of master axes, wherein said motion profile is obtained as a function of the master axes;
    making the masters depend on predetermined command variables, and making the motion profile in individual profile segments dependent in each case on a respective one of the masters;
    providing the masters such that at least two masters are different from one another; and
    making the at least two masters of the motion profile dependent on command variables that are different from one another.

2. A method as defined in claim 1; and further comprising selecting the command variables from a group of command variables consisting of positions, times, pressures, velocities, torques, forces, and combinations thereof.

3. A method as defined in claim 1; and further comprising at least partially different weighing of different command variables.

4. A method as defined in claim 1; and further comprising using at least one of the motion profiles, resulting in the profile segment, as a master for a further profile segment.

5. A method as defined in claim 1; and further comprising linking the masters to one another.

6. A method as defined in claim 1; and further comprising, by at least one intermediate segment, ascertaining a transition between two profile segments that depend on different masters.

7. A method as defined in claim 1; and further comprising assigning each of the profile segments at least one motion condition which varies said profile segment; by each motion condition varying at least one tripping effect and at least one action event associated with said at least one tripping effect and tripped by said at least one tripping event; and varying the profile segment by the action event.

8. A method as defined in claim 7; and further comprising calculating a change in the profile segment in real time.

9. A method as defined in claim 7; and further comprising calculating a change in a plurality of the profile segments in real time.

10. A method as defined in claim 9; and
further comprising calculating a change in all of the profile segments in real time.

11. A control apparatus for operating numerically controlled machines, comprising:

means configured such that a motion of at least one movable machine element of the machine is controlled using a motion profile specific to said motion, and said motion profile is subdivided into many profile segments;

a control device which causes each of the profile segments to be assigned masters, so that the masters depend on predetermined command variables, wherein each of said profile segments is assigned to a different master, and the motion profile in the various profile segments results in each case from the respective masters, and at least two masters are different from one another, and at least two masters of the motion profile depend on command variables that differ from one another; and a plurality of master axes, wherein said motion profile is obtained as a function of the master axes.

12. A control apparatus as defined in claim 11, wherein said control device is configured so that the at least two masters are not only different from one another but also independent of one another.

\* \* \* \* \*